(12) United States Patent
Waggle

(10) Patent No.: US 7,476,062 B2
(45) Date of Patent: Jan. 13, 2009

(54) CUTTING INSERT WITH RECESSED CORNERS

(75) Inventor: James M. Waggle, Derry, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/429,822

(22) Filed: May 8, 2006

(65) Prior Publication Data

US 2007/0258778 A1 Nov. 8, 2007

(51) Int. Cl.
*B23C 5/20* (2006.01)
(52) U.S. Cl. .......................... 407/113; 407/42; 407/116
(58) Field of Classification Search ................. 407/113, 407/42, 48, 116, 53
See application file for complete search history.

(56) References Cited

U.S. PATENT DOCUMENTS

| | | | | |
|---|---|---|---|---|
| 3,673,653 | A | | 7/1972 | Kaser |
| 4,685,844 | A | * | 8/1987 | McCreery et al. ............ 407/114 |
| 4,993,892 | A | * | 2/1991 | Takahashi ................... 407/114 |
| 5,147,158 | A | | 9/1992 | Riviere |
| 5,190,418 | A | * | 3/1993 | Nakayama et al. ............ 407/42 |
| 5,584,616 | A | * | 12/1996 | Katbi et al. ................... 407/114 |
| 5,741,095 | A | * | 4/1998 | Charron et al. ............... 407/42 |
| 5,947,648 | A | | 9/1999 | Friedman et al. |
| 6,039,515 | A | * | 3/2000 | Lamberg ..................... 408/188 |
| 6,050,752 | A | * | 4/2000 | DeRoche .................... 407/114 |
| 6,079,912 | A | * | 6/2000 | Rothballer .................. 407/114 |
| 6,290,436 | B1 | | 9/2001 | Qvarth |
| 6,769,844 | B2 | | 8/2004 | Waggle |
| 2002/0090272 | A1 | * | 7/2002 | Waggle ...................... 407/114 |
| 2002/0150496 | A1 | * | 10/2002 | Chandrasekar et al. ........ 419/33 |
| 2006/0177584 | A1 | * | 8/2006 | Gates et al. ............ 427/255.34 |
| 2006/0228179 | A1 | * | 10/2006 | Alm et al. .................... 407/113 |

* cited by examiner

*Primary Examiner*—Boyer D Ashley
*Assistant Examiner*—Sara Addisu
(74) *Attorney, Agent, or Firm*—Matthew W. Gordon

(57) ABSTRACT

The present invention is directed to a cutting insert with a rake face, a seating surface and a plurality of flank faces extending between the rake face and the seating surface. The intersection of the rake face and the plurality of flank faces define a plurality of cutting edges. The rake face of the insert has a plurality of corner regions formed at the intersection of side cutting edges to define corner cutting edges. The corner cutting edge in at least one corner region has a recessed profile when viewed from the side of the insert. The recessed profile has a concave shape and extends inwardly from the cutting edge. At the cutting edge, the recess has a conical shape to define a conical portion and further inward from the cutting edge the recess may have a cylindrical shape to define a cylindrical portion.

18 Claims, 7 Drawing Sheets

CUTTING INSERT WITH RECESSED CORNERS

BACKGROUND OF THE INVENTION

1. Field of the Invention

The present invention relates, in general, to a cutting insert used in metalworking operations and, more particularly, to chip flow control features on a cutting insert.

2. Description of Related Art

Cutting inserts are well known and a large percentage of them are of the throw away design. Such inserts are detachably clamped on a toolholder and then are discarded when they become dull or chipped. Throw away inserts are usually indexable and/or invertable so that an insert can be provided with at least two cutting edges for selective presentation to the cutting position. An indexable and/or invertable insert having multiple cutting edges is more economical because when one edge has been used, the insert may simply be indexed or inverted to the next usable edge. Such a feature is especially important when considering the high cost of materials from which inserts are produced.

The main object of metalworking is the shaping of a new work surface. Much attention is paid to the formation of the chip during the machining process, even though the chip is a waste product, because the consumption of energy occurs mainly in the formation and movement of the chip. Thus, an essential feature of any metalworking operation is effective chip flow. U.S. Pat. No. 6,769,844 entitled "Cutting Insert and Method of Making the Same" teaches a cutting insert with a convex wiper cutting edge with a chamfered corner provided between the cutting edges. This patent is assigned to the Assignee of the present application and is hereby incorporated by reference.

Because chip flow control is an important consideration in metal cutting operations, it has been a long standing objective in the art of metal cutting to develop improved chip flow control surfaces for use with cutting inserts.

SUMMARY OF THE INVENTION

The present invention is directed to a cutting insert comprising a rake face, a seating surface and a plurality of flank faces extending between the rake face and the seating surface. The intersection of the rake face and the plurality of flank faces define a plurality of side cutting edges. The rake face of the body has a plurality of corner regions formed at the intersection of side cutting edges to define corner cutting edges. The corner cutting edge in at least one corner region has a recessed profile when viewed from the side of the insert. The recessed profile has a concave shape and extends inwardly from the cutting edge. At the cutting edge, the recess has a conical shape to define a conical portion and further inward from the cutting edge the recess may have a cylindrical shape to define a cylindrical portion.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. As used in the specification and the claims, the singular form of "a", "an", and "the" include plural referents unless the context clearly dictates otherwise.

DETAILED DESCRIPTION OF THE PRESENT INVENTION

Figure 1:
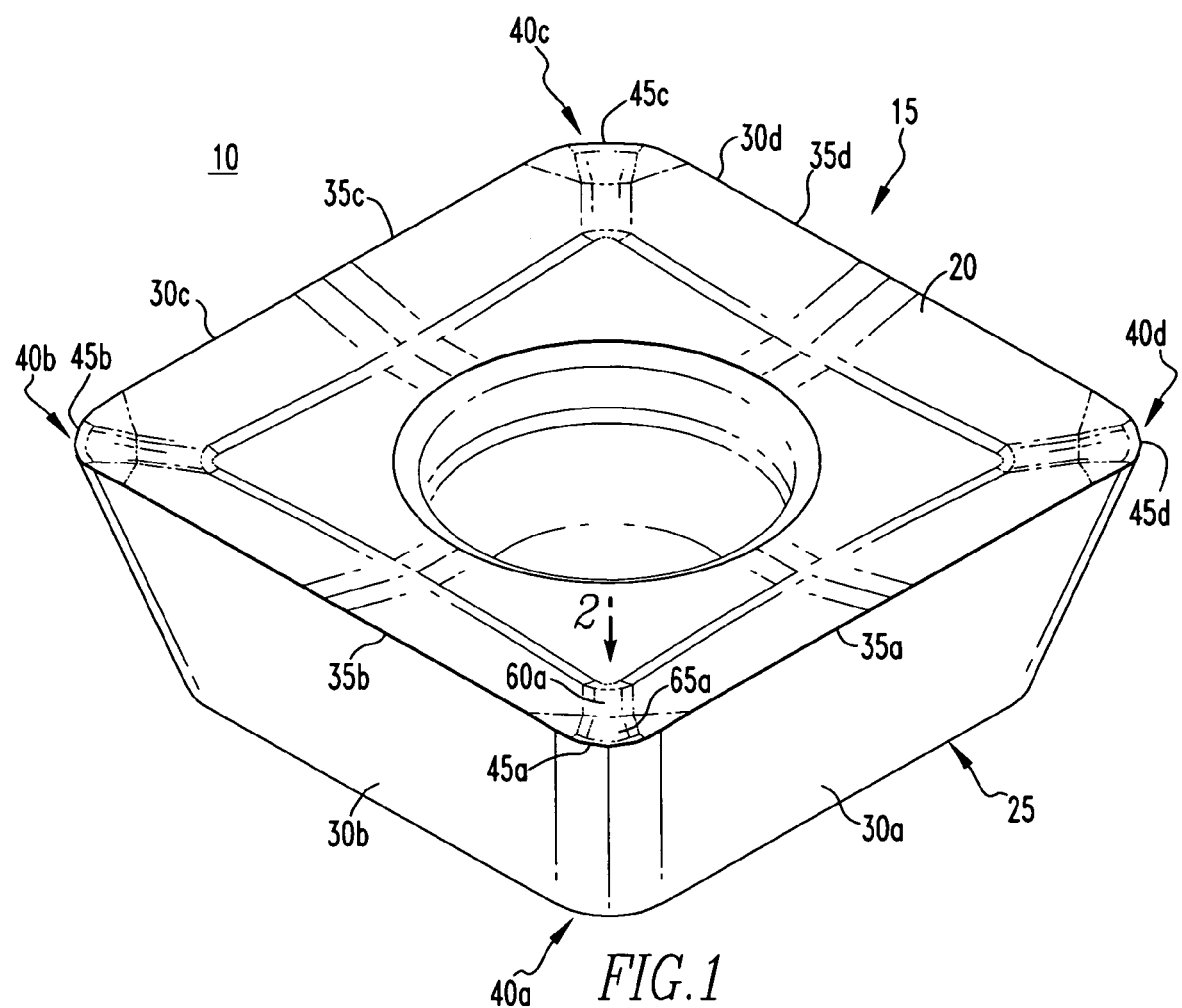
FIG. 1 is a perspective view of a cutting insert in accordance with the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Directing attention to FIG. 1, a cutting insert 10 has a body 15, comprised of a rake face 20 and a seating surface 25. A plurality of flank surfaces 30a-30d extends between the rake face 20 and the seating surface 25. A plurality of side cutting edges 35a-35d are defined by the intersection of the rake face 20 and the plurality of flank faces 30a-30d. The rake face 20 has a plurality of corner regions 40a-40d -formed at the intersection of the side cutting edges 35a-35d to define corner cutting edges 45a-45d.

As illustrated in FIG. 1, the body 15 has a substantially square shape. However, this is not to be construed as limiting as a variety of other cutting geometries for cutting insert 10 have been envisioned, including octagonal and pentagonal. It should further be appreciated that each of the cutting edges described herein can be indexed into a working or active position and effectively utilized in a cutting tool of a type well know in the art. One particular use for this cutting insert 10 may be with a plunge milling cutter.

For purposes of simplicity, corner region 40a will hereinafter be discussed with the understanding that such details may be applied to the remaining corner regions 40b-40d of the insert 10.

Figure 2A:
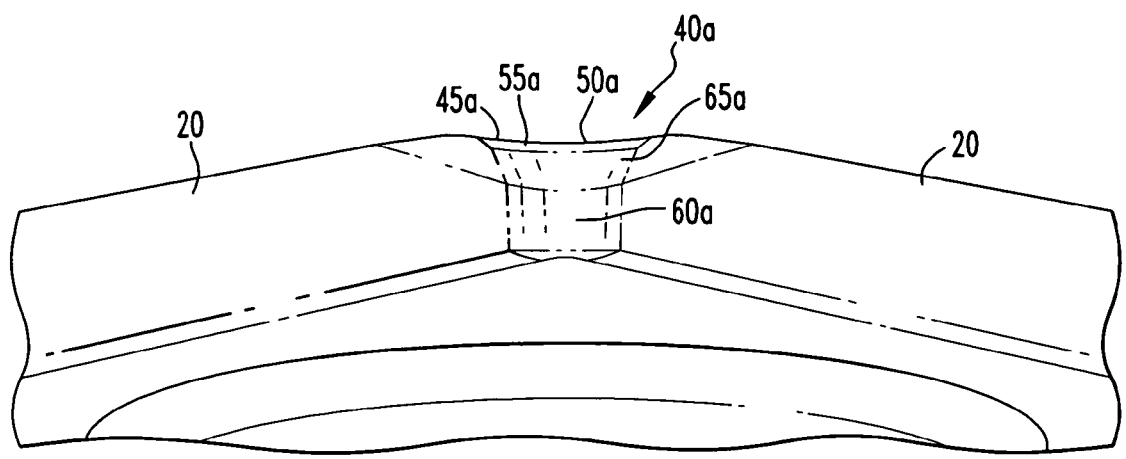
FIG. 2A is an enlarged perspective view of the corner region when viewed along arrow "2" in FIG. 1.
Figure 5:
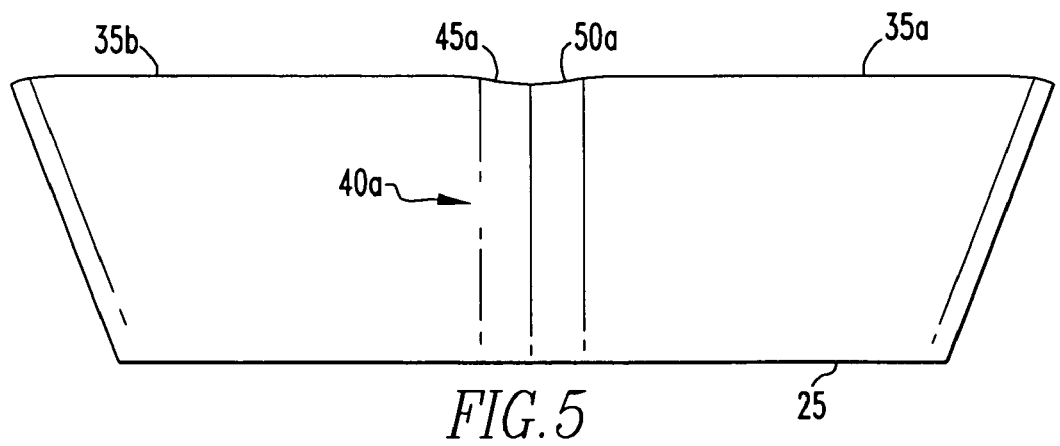
FIG. 5 is side elevational view of the cutting insert of FIG. 1 viewed from a corner.

Directing attention to FIGS. 2A and 5, the corner cutting edge 45a in the corner region 40a has a recessed profile 50a when viewed from the side of the body 15. As illustrated in FIGS. 2A and 5, the recessed profile 50a has a concave shape.

Figure 2B:
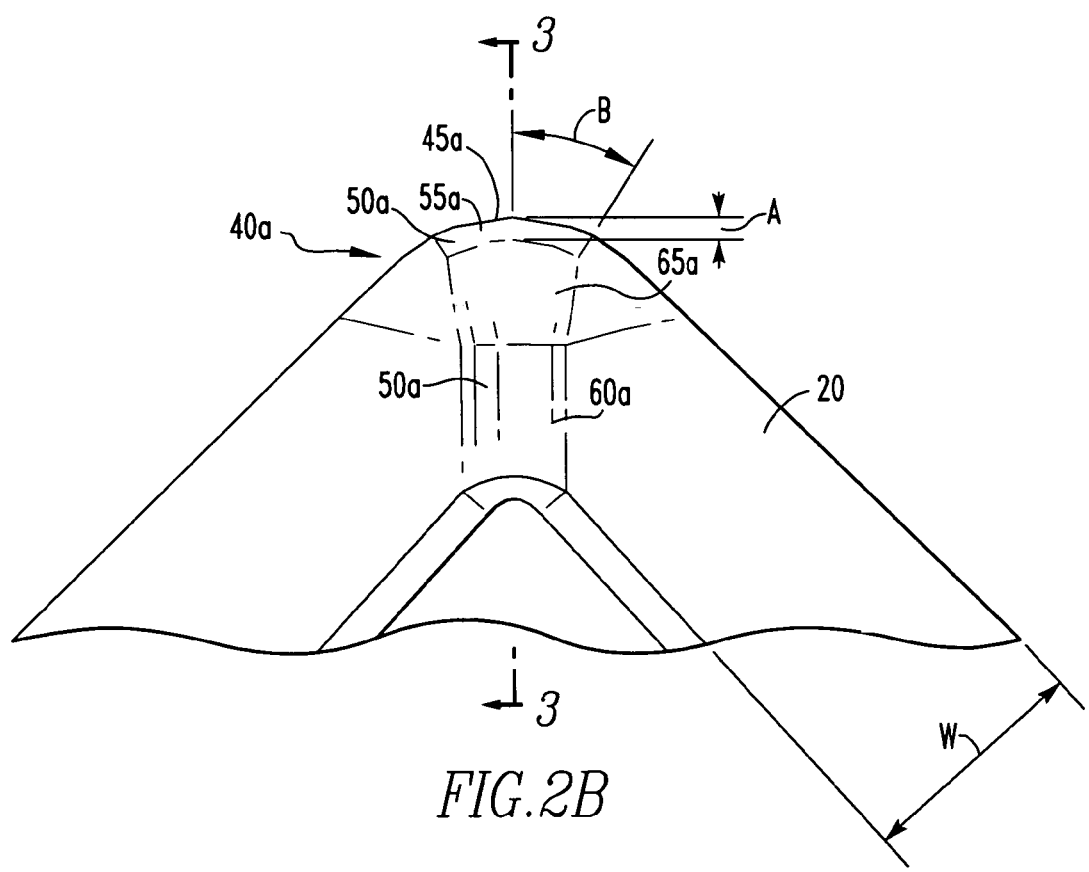
FIG. 2B is a top plan view of the corner highlighted in FIG. 2A.
Figure 3:
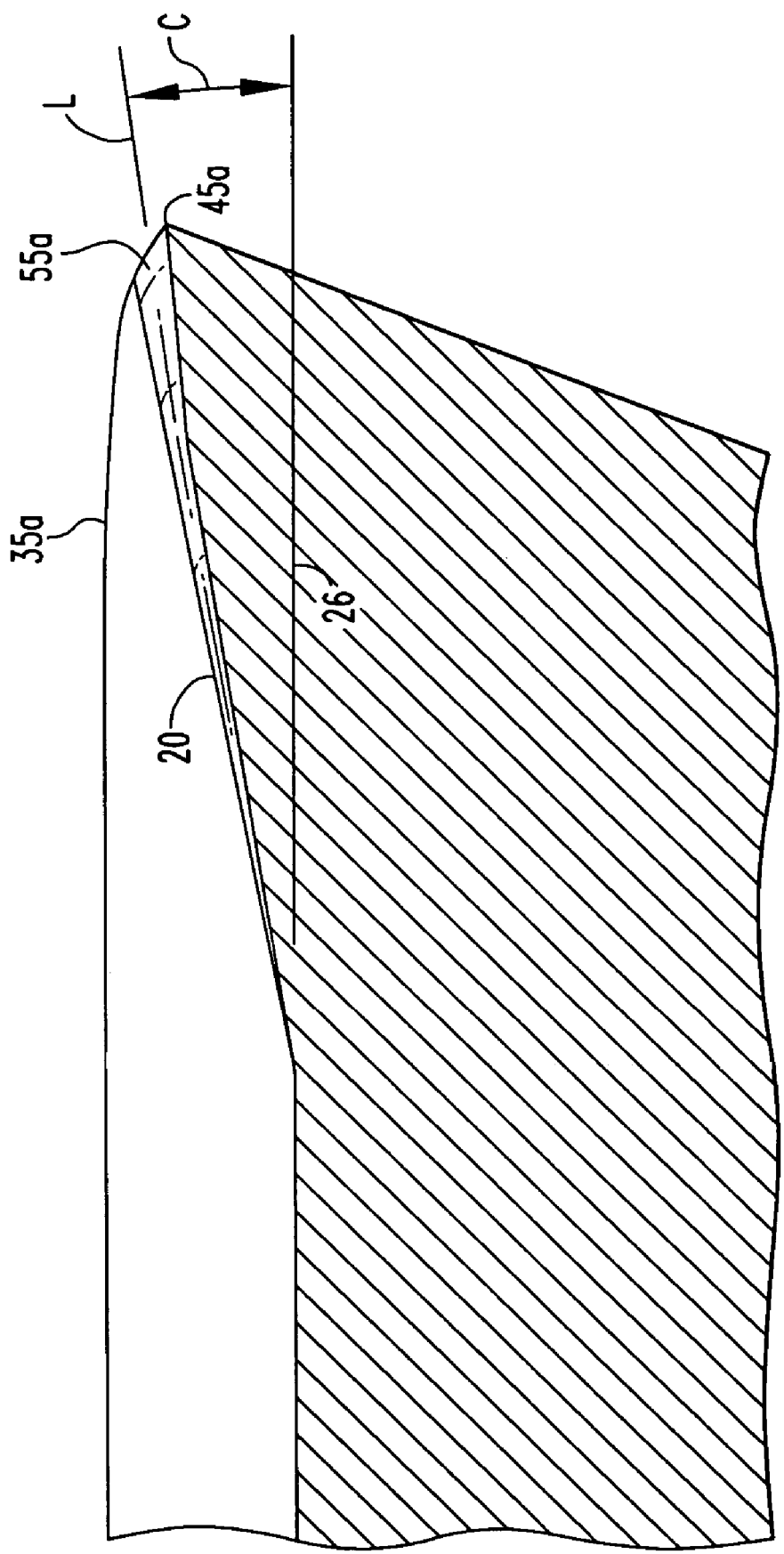
FIG. 3 is a cross-sectional view of the cutting insert taken along line 3-3 of FIG. 2B

Directing attention to FIGS. 2A and 2B, the recessed profile 50a extends inwardly from the corner cutting edge 45a. The recessed profile 50a extends inwardly and into the rake face 20 from the corner cutting edge 45a. As illustrated in FIGS. 2A and 3, the recessed profile 50a has a conical shape to define a conical portion 55a. Briefly directing attention to FIG. 2B, the conical portion 55a extends inwardly from the corner cutting edge 45a a distance "A" of about 0.02-0.030 inches and preferably is in the range of about 0.005-0.006 inches. Additionally, directing attention to FIG. 2B, the conical portion 55a may have a cone angle "B" of between about 5-45 degrees with a preferred angle of about 20 degrees. As illustrated in FIG. 3, the central axis L of the cone may form an angle "C" with a line 26 parallel with the seating surface 25 of the body 15 of between about 2-30 degrees and preferably between about 5-10 degrees.

As illustrated in FIG. 2B, the recessed profile 50a extends inwardly over the entire width W of the rake face 20.

As furthermore illustrated in FIG. 2B, the recessed profile 50a may include a cylindrical portion 60a recessed within the rake face 20 and located inwardly of the conical portion 55a. A blending portion 65a may connect the conical portion 55a with the cylindrical portion 60a to provide for a smooth transition between these portions.

Figure 6:
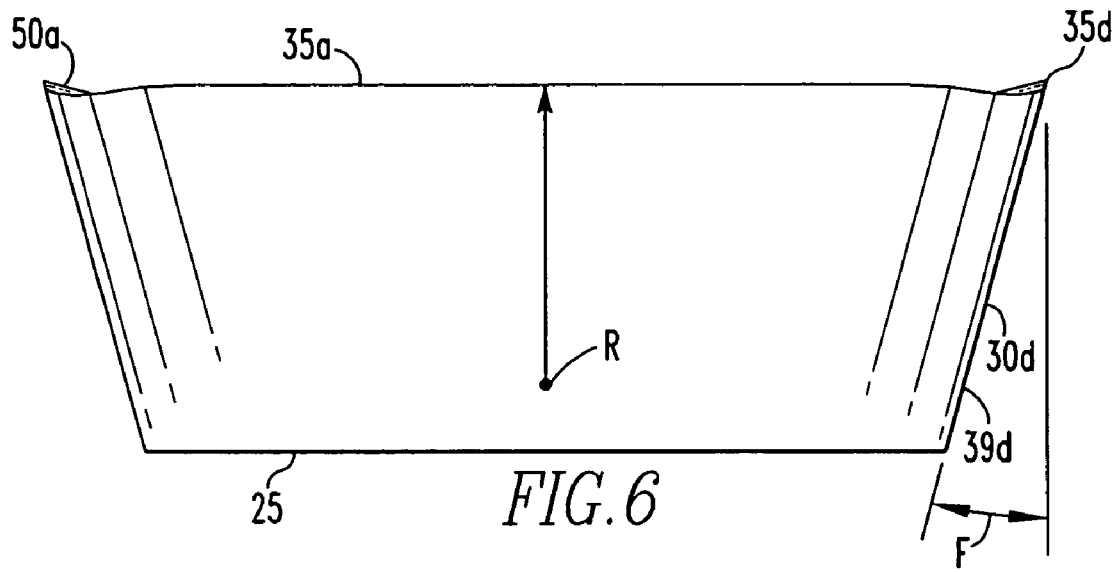
FIG. 6 is a side elevational view of the cutting insert of FIG. 1 viewed from a side.

Directing attention to FIGS. 5 and 6, the cutting edges 35a, 35b, for example, adjacent to the corner region 40a may be straight or convex when viewed from the side as illustrated in FIG. 6. For example, cutting edge 35a as illustrated in FIG. 6 may have a radius of curvature R of approximately 8 inches. Briefly directing attention to FIG. 3, it can be easily envisioned that the rake face 20 may also have a convex profile as it extends inwardly from the cutting edge 35a.

So far discussed has been a cutting edge 35a that is directly adjacent to the rake face 20 wherein the rake face has a positive rake face angle such that the cutting edge 35a is relatively sharp and the edge may be honed to provide a radius thereupon to increase the strength of the cutting edge 35a. Directing attention to FIG. 7, it is entirely possible to introduce a land 70 between the cutting edge 35a and the rake face 20 thereby providing additional strength to the cutting edges such as cutting edge 35a.

Figure 7:
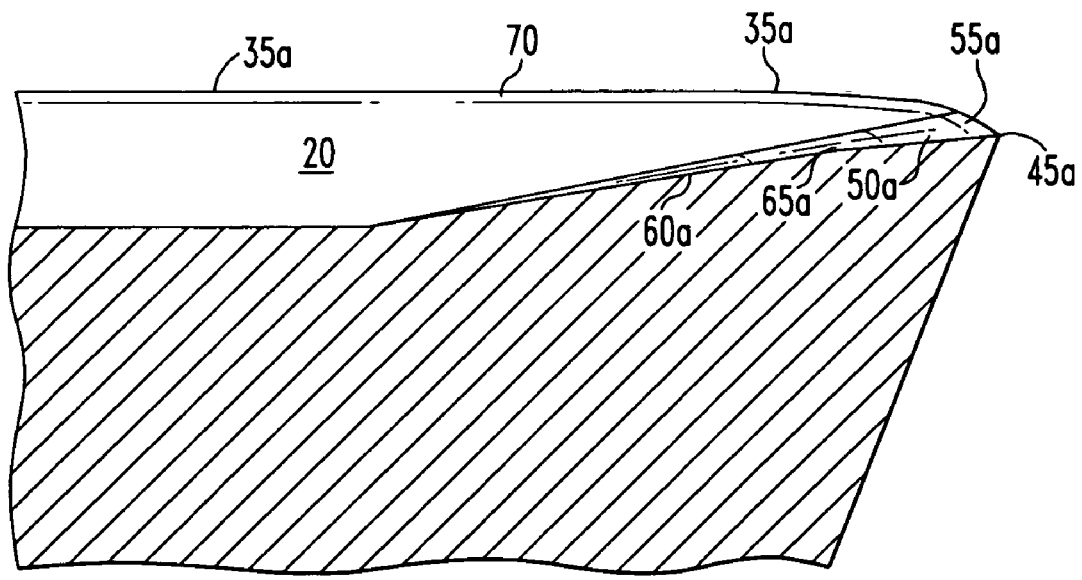
FIG. 7 is a cross-sectional view of the cutting insert taken along line 3-3 of FIG. 2B but presenting another embodiment whereby the insert has a land adjacent to the cutting edge.

As illustrated in FIG. 7, the recessed profile 50a extends inwardly from the corner cutting edge 45a into the rake face 20. In particular, the recessed portion 50a continues inwardly from the cutting edge 45a with the conical portion 55a extending into the rake face 20. Thereafter, the recessed profile 50a continues to extend inwardly to the blending portion 65a and into the cylindrical portion 60a. In operation, the cutting edge 45a follows the cutting edge 35 and causes the cutting chip to lift and flow away from the workpiece.

Directing attention to FIG. 6, each flank face, for example flank face 30d, is substantially flat and forms a clearance angle "F" of between about 0-30 degrees, preferably about 11-20 degrees, with a line perpendicular to the generally planar surface defined by the cutting edges 35.

Figure 4:
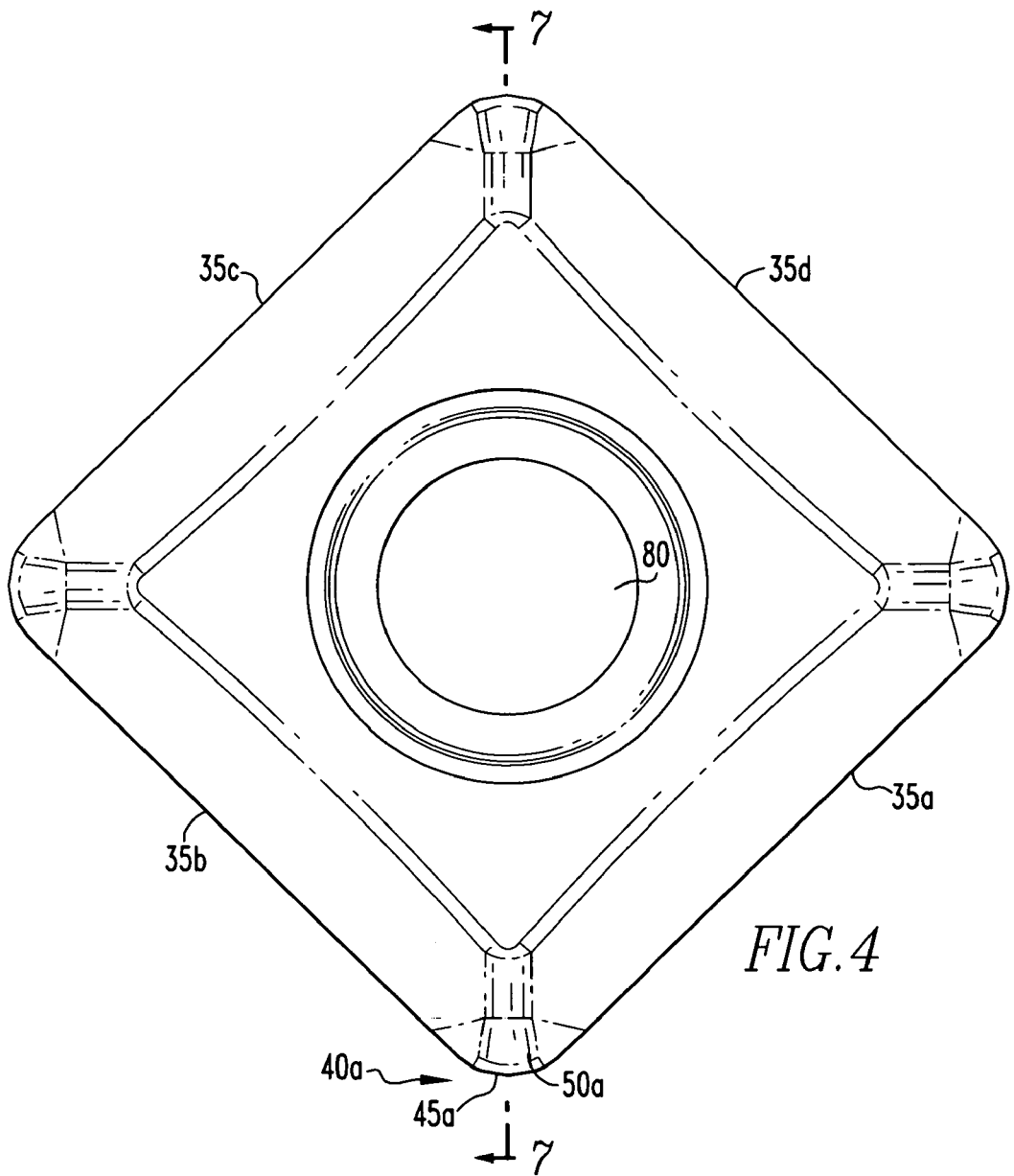
FIG. 4 is a top plan view of the cutting insert of FIG. 1.
Figure 8:
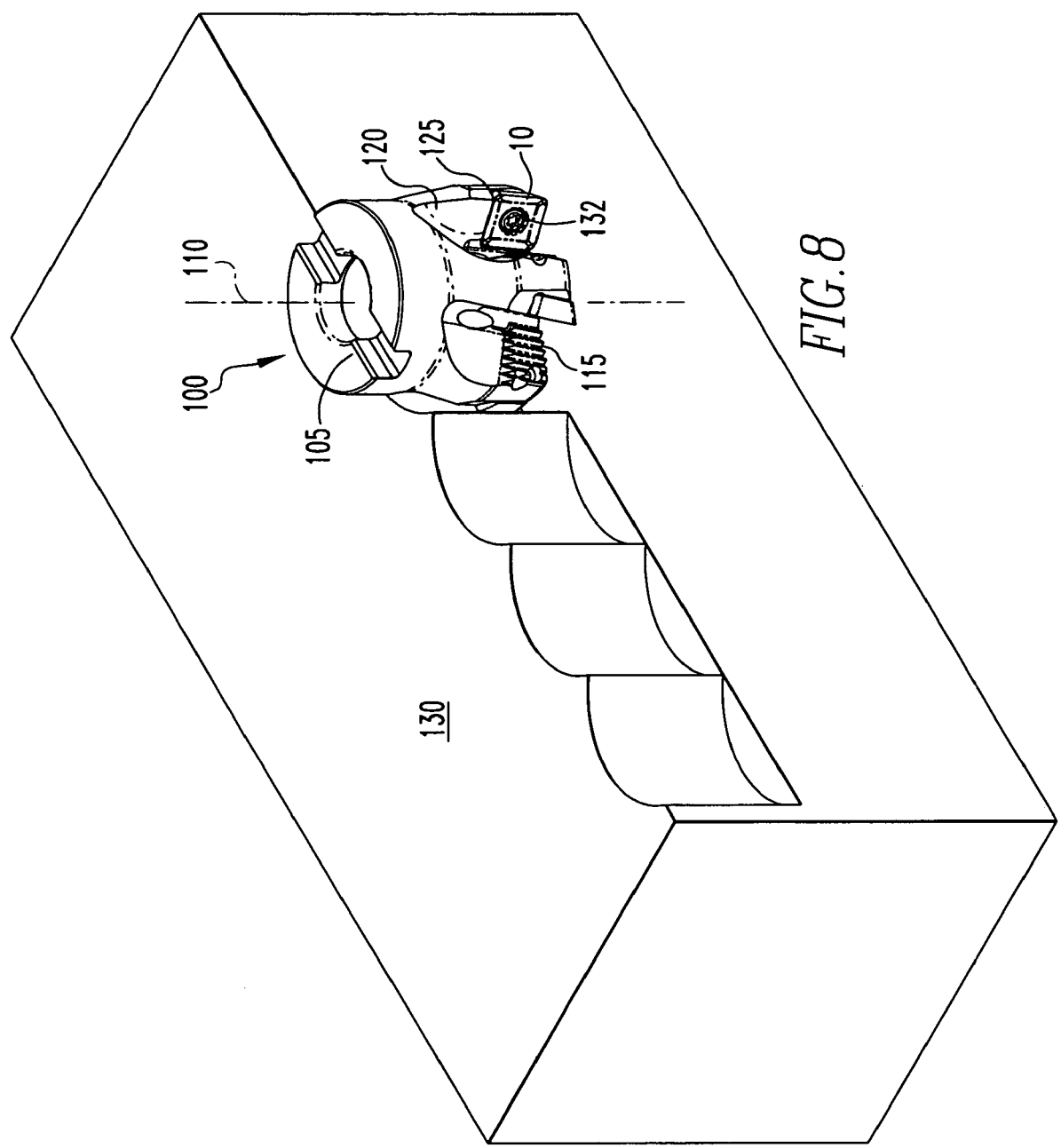
FIG. 8 is a perspective view of a rotating toolholder utilizing the cutting insert in accordance with the present invention to machine a workpiece.

FIG. 8 shows the cutting insert 10 mounted within a toolholder and machining a workpiece. In particular, FIG. 8 illustrates the cutting insert 10 mounted within a milling cutter 100. The milling cutter 100 is comprised of a body 105 which extends along a longitudinal axis 110 and has a first end 115. A recess 120 extends into the first end 115 and has an insert pocket 125 adapted to receive the cutting insert 10. The cutting insert 10 may have a bore 80 (FIG. 4) extending therethrough to accommodate a mounting screw 132 which may be threadably engaged within a threaded bore (not shown) extending through a floor in the pocket 125 of the recess 120. Utilizing this arrangement, the milling cutter 100 may be rotated about longitudinal axis 110 in a clockwise direction such that the cutting insert 10 engages the workpiece 130 to form the workpiece 130 in the desired shape.

Figure 9:
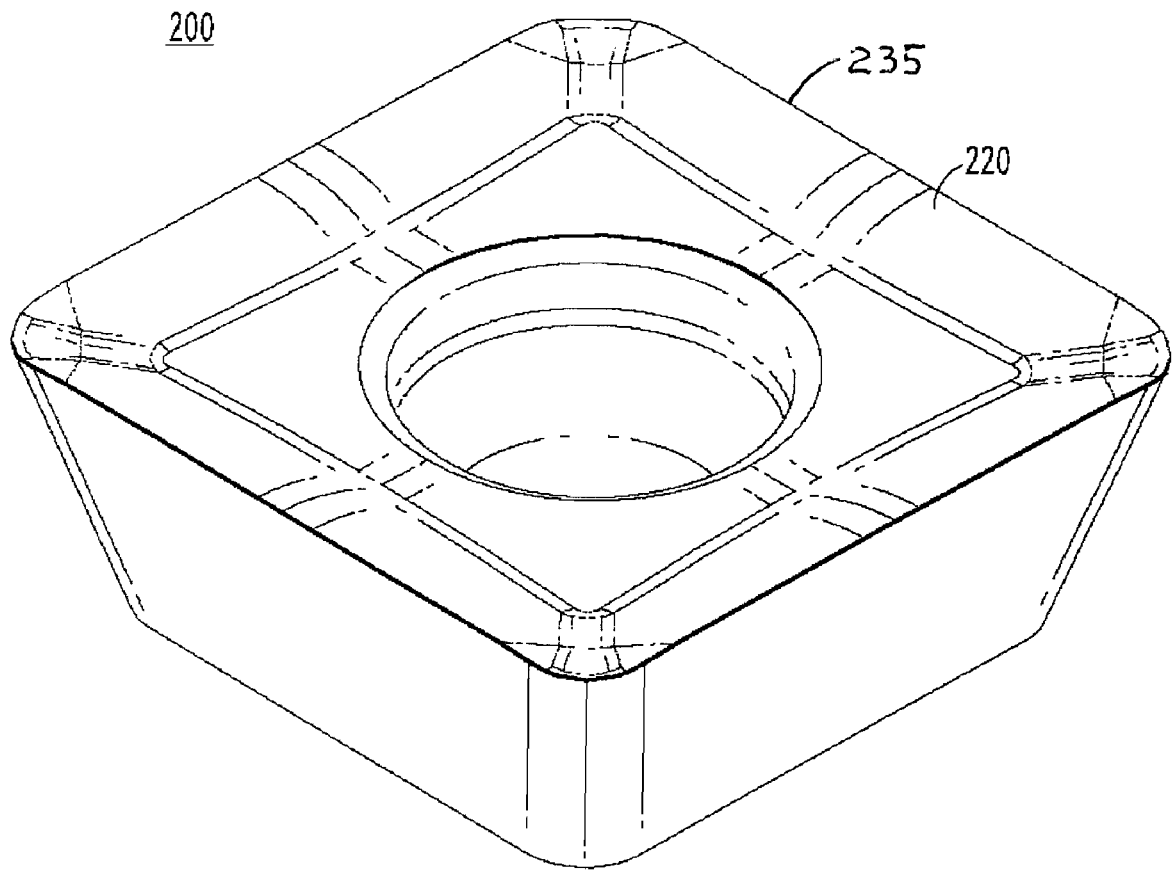
FIG. 9 is a perspective view of a cutting insert similar to that insert shown in FIG. 1 but, wherein the rake face has a convex profile.

FIG. 9 shows a perspective view of a cutting insert 200 similar to insert 10 in FIG. 1 but with a rake face 220 which has a convex profile as it extends away from the cutting edge 235.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A cutting insert having a body comprising:
    a) a rake face;
    b) a seating surface;
    c) plurality of flank faces extending between the rake face and the seating surface, wherein the intersection of the rake face and the plurality of flank faces defines a plurality of side cutting edges; and
    d) wherein the rake face of the body has a plurality of corner regions formed at the intersection of side cutting edges to define corner cutting edges, wherein the corner cutting edge in at least one corner region has a recessed profile when viewed from a corner region of the insert body, wherein the rake face generally drops from the cutting edge to form a positive rake angle, wherein the recessed profile has a concave shape and extends inwardly from the corner cutting edge into the rake face of the insert body.

2. The cutting insert according to claim 1, wherein each corner region has a land extending inwardly from the corner cutting edge and the recessed profile extends into the land.

3. The cutting insert according to claim 2, wherein the recessed profile has a conical shape.

4. The cutting insert according to claim 1, wherein the recessed profile has a conical shape to define a conical portion.

5. The cutting insert according to claim 4, wherein the conical portion extends inwardly from the cutting edge by about between 0.002-0.030.

6. The cutting insert according to claim 4, wherein the conical portion has a cone angle of between about 5-30 degrees.

7. The cutting insert according to claim 6, wherein the conical portion has a central axis and the central axis forms an angle with the seating surface of between about 2-15 degrees.

8. The cutting insert according to claim 4, wherein the recessed profile extends inwardly over the entire width of the rake face.

9. The cutting insert according to claim 8, wherein the recessed profile further includes a cylindrical portion recessed within the rake face inwardly of the conical portion.

10. The cutting insert according to claim 9, further including a blending portion connecting the conical portion with the cylindrical portion.

11. The cutting insert according to claim 1, wherein the cutting edges between the corner portions are convex when viewed from the side.

12. The cutting insert according to claim 11, wherein the cutting edges are honed.

13. The cutting insert according to claim 11, wherein the rake face has a convex profile as it extends inwardly from the cutting edge.

14. The cutting insert according to claim 1, wherein the flank faces are substantially flat.

15. The cutting insert according to claim 1, wherein the body has a substantially square shape.

16. A cutting insert having a body comprising:
a rake face having a sloping portion;
a plurality of flank faces, wherein at least one of the flank faces has a positive clearance angle;
at least two side cutting edges formed at an intersection between the rake face and one of the plurality of flank faces, wherein the side cutting edges are adjacent to one another;
at least one corner cutting edge formed at an intersection of the two adjacent side cutting edges;
wherein, a recessed corner portion having a generally conical shape is provided at the at least one corner cutting edge and the recessed corner portion extends through the corner cutting edge; and
wherein the rake face generally drops from the cutting edge to form a positive rake angle.

17. The cutting insert according to claim 1, further including a land between the cutting edges and the rake face.

18. The cutting insert according to claim 16, further including a land between the cutting edges and the rake face.

* * * * *